United States Patent [19]
Mazor

[11] Patent Number: 5,235,671
[45] Date of Patent: Aug. 10, 1993

[54] DYNAMIC BIT ALLOCATION SUBBAND EXCITED TRANSFORM CODING METHOD AND APPARATUS

[75] Inventor: Baruch Mazor, Newton Center, Mass.

[73] Assignee: GTE Laboratories Incorporated, Waltham, Mass.

[21] Appl. No.: 597,438

[22] Filed: Oct. 15, 1990

[51] Int. Cl.⁵ .............................................. G10L 9/02
[52] U.S. Cl. ........................................................ 395/2
[58] Field of Search ................................. 381/41–50, 381/29–40; 395/2

[56] References Cited

U.S. PATENT DOCUMENTS

| | | | |
|---|---|---|---|
| 4,184,049 | 1/1980 | Crochiete et al. | 179/1 SA |
| 4,330,689 | 5/1982 | Kang et al. | 179/15.55 R |
| 4,455,649 | 6/1984 | Esteben et al. | 381/29 |
| 4,535,472 | 8/1985 | Tomcik | 381/31 |
| 4,538,234 | 8/1985 | Honda et al. | 381/31 |
| 4,610,022 | 9/1986 | Kitayama et al. | 381/36 |
| 4,790,016 | 12/1988 | Mazor et al. | 381/36 |
| 4,914,701 | 4/1990 | Zibman | 381/36 |
| 4,956,871 | 9/1990 | Swaminathan | 381/31 |
| 5,042,069 | 8/1991 | Chhatwal et al. | 381/36 |

FOREIGN PATENT DOCUMENTS

0176243A3 2/1986 European Pat. Off. .

OTHER PUBLICATIONS

Mazor, B., "An Optimal Transform Trellis Code with Applications to Speech" Oct., 1985, vol. COM-33, 10:1111–1112.

Flanagan, J. L. et al., "Speech Coding," *IEEE Transactions on Communications*, vol. Com-27, 4:710–736 (1979).

Kang, G. S. et al., "Mediumband Speech Processor with Baseband Residual Spectrum Encoding," Naval Research Lab, Washington, D.C. 20375, 1981, pp. 820–823.

Tribolet, J. M. et al., "Frequency Domain Coding of Speech," *IEEE Transactions on Acoustics, Speech and Signal Processing*, vol. ASSP-27, No. 5, Oct., 1979, pp. 512–530.

Westerink, P. H. et al, "An Optimal Bit Allocation Algorithm For Sub-Band Coding," Proceedings of 1988 IEEE International Conference on Acoustics, Speech and Signal Processing, vol. II, pp. 757–760, New York, 11–14 Apr. 1988.

*Primary Examiner*—Allen R. MacDonald
*Assistant Examiner*—Michelle Doerrler
*Attorney, Agent, or Firm*—Hamilton, Brook, Smith & Reynolds

[57] ABSTRACT

In an adaptive subband excited transform speech encoding system, a range of quantizers are available and are dynamically selected for each window of speech. The quantizers designated for individual subbands are determined to minimize mean squared error distortion in the recreated signal while using no more than a predetermined number of quantization bits per window of speech.

18 Claims, 5 Drawing Sheets

DYNAMIC BIT ALLOCATION SUBBAND EXCITED TRANSFORM CODING METHOD AND APPARATUS

BACKGROUND OF THE INVENTION

Conventional analog telephone systems are being replaced by digital systems. In digital systems, the analog signals are sampled at a rate of greater than or equal to about twice the bandwidth of the analog signals or about eight kilohertz, and the samples are then encoded. In a simple pulse code modulation system (PCM). each sample is quantized as one of a discrete set of prechosen values and encoded as a digital word which is then transmitted over the telephone lines. With eight bit digital words, for example, the analog sample is quantized to $2^8$ or 256 levels, each of which is designated by a different eight bit word. Using nonlinear quantization, excellent quality speech can be obtained.

Efforts have been made to reduce the bit rates required to encode the speech and obtain a clear decoded speech signal at the receiving end of the system. The linear predictive coding (LPC) technique is based on the recognition that speech production involves excitation and a filtering process. The excitation is determined by the vocal cord vibration for voiced speech and by turbulence for unvoiced speech, and that actuating signal is then modified by the filtering process of vocal resonance chambers including the mouth and nasal passages. For a particular group of samples, a digital linear filter which simulates the formant effects of the resonance chambers can be defined and the definition can be encoded. A residual signal which approximates the excitation can then be obtained by passing the speech signal through an inverse formant filter, and the residual signal can be encoded. Because sufficient information is contained in the lower-frequency portion of the residual spectrum, it is possible to encode only the low frequency baseband and still obtain reasonably clear speech. At the receiver, a definition of the formant filter and the residual baseband are decoded. The baseband is repeated to complete the spectrum of the residual signal. By applying the decoded filter to the repeated baseband signal, an approximation to the initial speech can be reconstructed.

A major problem of the LPC approach is in defining the formant filter which must be redefined with each window of samples. A problem with such systems is that they do not always provide a satisfactory reconstruction of certain formants such as that resulting from nasal resonance. As a result, the quality of reconstruction from 16,000 bits per second is generally unsatisfactory.

Another speech coding scheme which exploits the concepts of excitation-filter separation and excitation baseband transmission is described by Zibman in U.S. Pat. No. 4,914,701. In that approach, speech is encoded by first performing a Fourier transform of a window of speech. The Fourier transform coefficients are normalized by first defining a piecewise constant approximation of the spectral envelope and then scaling the frequency coefficients relative to the approximation. The normalization is accomplished first for each formant region and then repeated for smaller subbands. Quantization and transmission of the spectral envelope approximations amount to transmission of a filter definition. Quantization and transmission of the scaled frequency coefficients associated with either the lower or upper half of the spectrum amounts to transmission of a "baseband" excitation signal. At the reciever, the full spectrum of the excitation signal is obtained by adding the transmitted baseband to a freqency translated version of itself. Frequency translation is performed easily by duplicating the scaled Fourier coefficients of the baseband into the corresponding higher or lower frequency positions. A signal can then be fully recreated by inverse scaling with the tranmitted piecewise-constant approximations. This coding approach can be very simply implemented and provides good quality speech at 16 kilobits per second. However, it performs poorly with non-speech voice-band data transmission.

A modification of the Zibman coding technique is presented by Mazor et al. in U.S. Pat. No. 4,790,016. In that approach, the transform spectrum is divided into a plurality of subbands of coefficients. The approximate envelope is defined for each subband and each envelope definition is encoded for transmission. As in the Zibman approach, each spectrum coefficient is scaled relative to the defined envelope of the respective subband. In the Mazor et al. improvement, the number of bits to which each coefficient is encoded is determined by the defined envelope of its subband. Specifically, the four subbands having the largest initial peak energy, and thus the largest envelope definition, are quantized to seven bits for each coefficient. The four subbands having the next smaller envelope definitions are quantized to six bits per coefficient, and the four next smaller subbands are quantized to four bits per coefficient The coefficients of the remaining subbands are not transmitted; that is, they were quantized to zero bits per coefficient At the receiver, the transmitted subbands are replicated to define coefficients of frequencies which are not transmitted.

DISCLOSURE OF THE INVENTION

The prior Mazor et al. system resulted in much less than optimal bit allocation with certain types of signals. For example, a narrow band signal such as a tone might be best treated by allocating all available bits to only one or two subbands. In the prior Mazor et al. system, bits were allocated to 12 subbands regardless of the signal, so the bits allocated to a number of the subbands would be wasted with the narrow band signal. On the other hand, with wide band signals like white noise all subbands have about the same signal level, and it would therefore be better to evenly distribute all available bits across the full spectrum. In the prior Mazor et al. system the bits would always be allocated in the same way to 12 subbands.

The present invention is an improvement to the Mazor et al approach. As in that approach, a discrete transform of a window of speech is performed to generate a discrete spectrum of coefficients. An approximate envelope of the discrete spectrum is defined in each of a plurality of subbands of coefficients. The envelope definition of each subband of coefficients is digitally encoded. A plurality of quantizers of different bit lengths are available for encoding scaled spectrum coefficients within each subband With the present invention, the number of subbands applied to each quantizer is determined for each window of speech. Thus, the quantizers used and the number of subbands using the quantizers may be determined for each window of speech to minimize distortion due to quantization error.

In the preferred embodiment, the bit allocation is determined through an iterative process in which distortion is estimated and the bit allocation is computed from the estimated distortion. The distortion is then re-estimated to obtain a bit allocation which approaches the number of quantization bits available for the window. Specifically, the number of bits allocated to each subband is computed as the number of bits greater than or equal to zero which is approximately equal to and derived from $\log_2 P_i/D$ where $P_i$ is a power estimate for the subband and D is the expected mean squared error distortion for the entire window of speech. Preferably, $P_i$ is estimated by table look-up from the envelope definition of each subband.

In the preferred system, where the calculated allocation does not equal the number of available bits, the system adds bits to the higher energy subbands or subtracts bits from the lower energy subbands to make use of the full number of bits available for the window.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
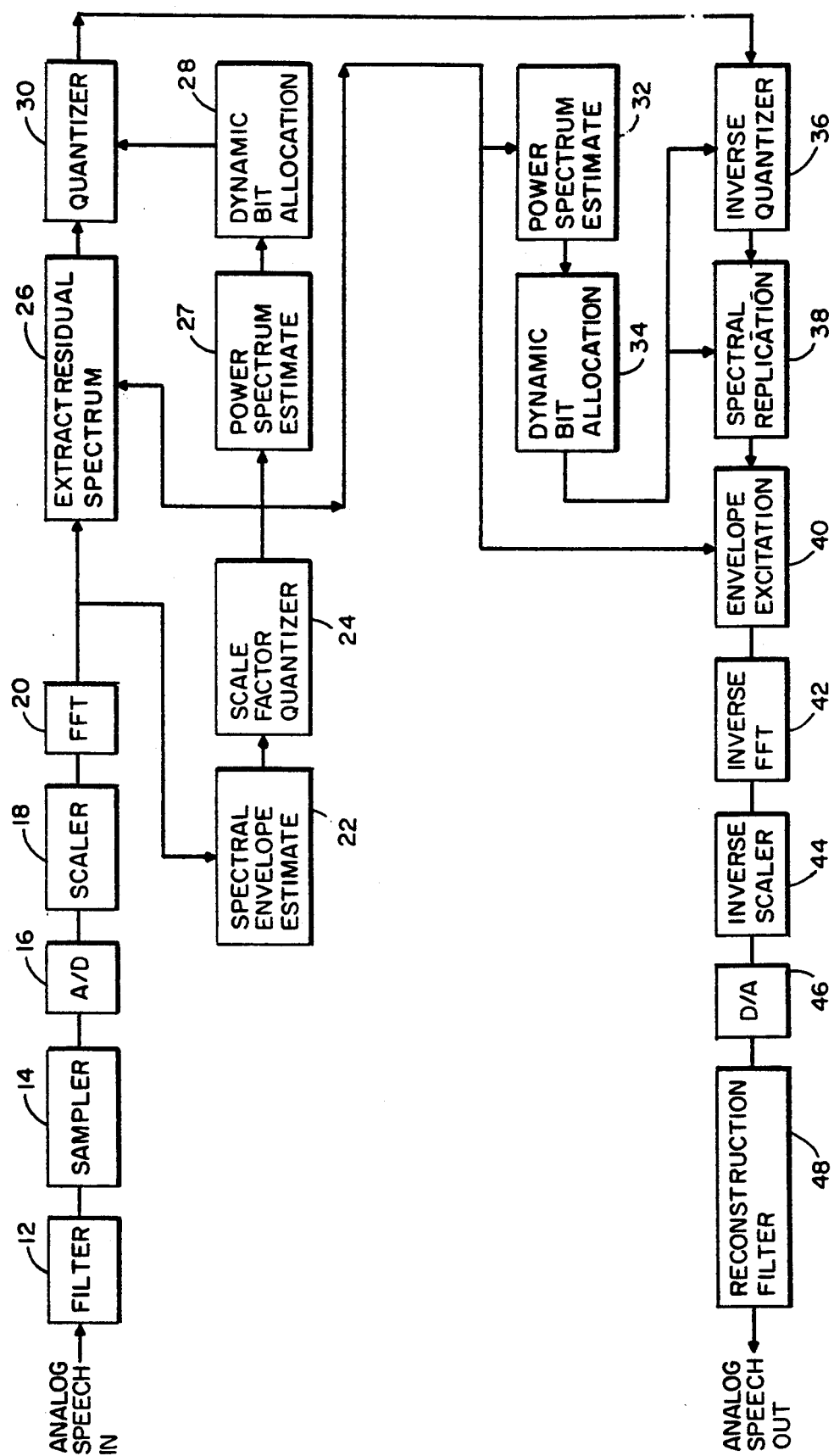
FIG. 1 is a block diagram of a speech encoder and corresponding decoder of a coding system embodying the present invention.

A block diagram of the coding system is shown in FIG. 1. Prior to compression, the analog speech signal is low pass filtered in filter 12 at 3.4 kilohertz, sampled in sampler 14 at a rate of 8 kilohertz, and digitized using a 12 bit linear analog to digital converter 16. It will be recognized that the input to the encoder may already be in digital form and may require conversion to the code which can be accepted by the encoder. The digitized speech signal, in frames of N samples, is first scaled up in a scaler 18 to maximize the numerical resolution in the ensuing processing steps. The scaled input samples are then Fourier transformed in a fast Fourier transform device 20 to obtain a corresponding discrete spectrum represented by $(N/2)+1$ complex frequency coefficients.

In a specific implementation, the input frame size equals 180 samples and corresponds to a frame every 22.5 milliseconds. However, the discrete Fourier transform is performed on 192 samples, including 12 samples overlapped with the previous frame, preceded by trapezoidal windowing with a 12 point slope at each end. The resulting output of the FFT includes 97 complex frequency coefficients spaced 41.667 Hertz apart.

Figure 2:
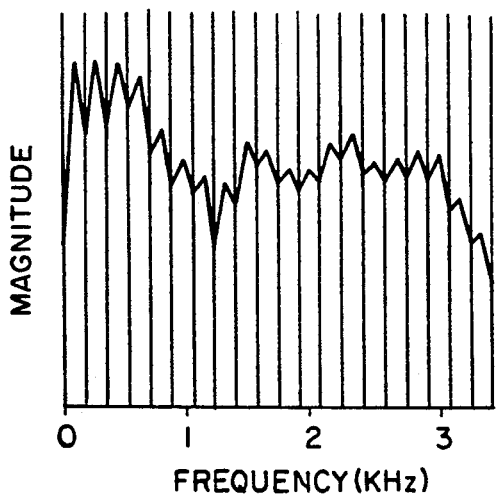
FIG. 2 is an example of a magnitude spectrum of the Fourier transform of a window of speech illustrating principles of the present invention.

An example magnitude spectrum of a Fourier transform output from FFT 20 is illustrated in FIG. 2. Although illustrated as a continuous function, it is recognized that the transform circuit 20 actually provides only 97 incremental complex outputs.

Following the basic approach of Mazor et al. presented in U.S. Pat. No. 4,790,016, the magnitude spectrum of the Fourier transform output is equalized and encoded. To that end, the spectrum is partitioned into L contiguous subbands and a spectral envelope estimate is based on a piecewise constant approximation of those subbands at 22. In a specific implementation, the spectrum is divided into twenty subbands, each including four complex coefficients. Frequencies above 3291.67 Hertz are not encoded and are set to zero at the receiver. To equalize the spectrum, the spectral envelope of each subband is assumed constant and is defined by the peak magnitude in each subband as illustrated by the horizontal lines in FIG. 2. Each magnitude, or more correctly the inverse thereof, can be treated as a scale factor for its respective subband. Each scale factor is quantized in a quantizer 24 to q bits. For example, q may equal 4.

Figure 3:
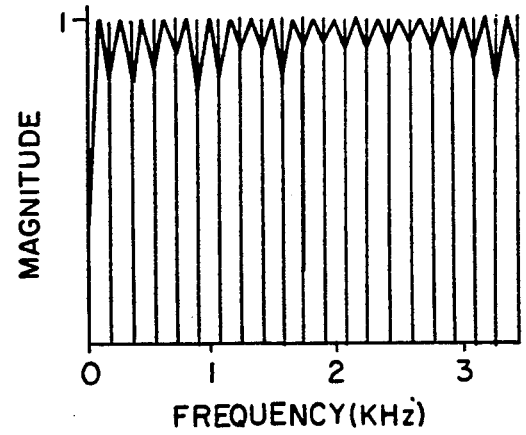
FIG. 3 is an example spectrum normalized from that of FIG. 2 based on principles of the present invention.

By then multiplying at 26 the magnitude of each coefficient of the spectrum by the scale factor associated with that coefficient, the flattened residual spectrum of FIG. 3 is obtained. This flattening of the spectrum is equivalent to inverse filtering the signal based on the piecewise-constant estimate of the spectral envelope.

Only selected subbands of the flattened spectrum of FIG. 3 are quantized and transmitted, and the selection is based on the spectral envelope of the subbands. In accordance with the prior Mazor et al, approach, the number of transmitted subbands and the bit allocation to the transmitted subbands are both predetermined (off-line) and kept fixed. Specification of the subbands which are transmitted using the predetermined bit allocation is adapted to each window of speech.

In accordance with the present invention, the number of subbands to be transmitted and the bit allocation to the subbands are recalculated (on-line) for each coding frame (speech window) to match the signal short-term spectral power distribution. The procedure used to calculate the per-frame allocation is the dynamic bit-allocation 28. Given the frame spectral envelope estimate and the total number of available quantization bits, the algorithm attempts to minimize the residual coefficients average quantization error (in the mean squared-error, mse, sense) for that frame. This process automatically adjusts the bit allocation to match the spectral characteristics of the signal and the specified compression rate.

Given a total number of available quantization bits $B_T$ and an available set of quantizers for quantizing coefficients, the system searches for a bit allocation $B = (b_1, b_2, \ldots b_i, \ldots b_L)$ where $b_i$ is the number of bits per coefficient in the i-th subband. The available quantizers quantize to a number of bits from the range [0, minb, minb+1, minb+2, ..., maxb]. The bit allocation is such that (1) $b_i$ is a nonnegative integer in the range of available quantizers, (2) $b_1+b_2+\ldots+b_L \leq B_T$, and (3) the average quantization error is minimized.

The search for optimal allocation is based on the unconstrained solution $r_i = \max[0, \log_2(P_i/D)] = \max[0, LP_i - LD)]$, where D is the expected mse distortion for the window of speech, $r_i$ is a nonnegative real number, and $LP_i$ and $LD$ are respectively the log-power and log-mse terms. The solutions $r_i$ are rounded to the available quantization levels to provide $b_i$. The power of spectrum density $P=(P_1, P_2, \ldots, P_i, \ldots P_L)$ can be derived from the spectral envelope coefficients. In accordance with the present approach, the expected distortion D is estimated and the bit allocation vector B is calculated from the unconstrained solution of $r_i$. In an iterative process, the distortion D is then re-estimated and the bit allocation vector B is recomputed to obtain the bit allocation for which the sum $B_S = b_1 + b_2 + \ldots + b_L$ is as close as possible to $B_T$. The bit allocation is then fine-tuned to make full use, or nearly full use, of the available bits $B_T$.

Although the power density $P_i$ could be computed directly from the four coefficients of each subband, it is in this case only estimated or derived at 27 from the i-th subband spectral envelope. From the spectral envelope estimate obtained at 22, the power density is obtained from a precalculated conversion table. As a result, no additional side information is needed to transmit the power spectrum density.

Figure 4:
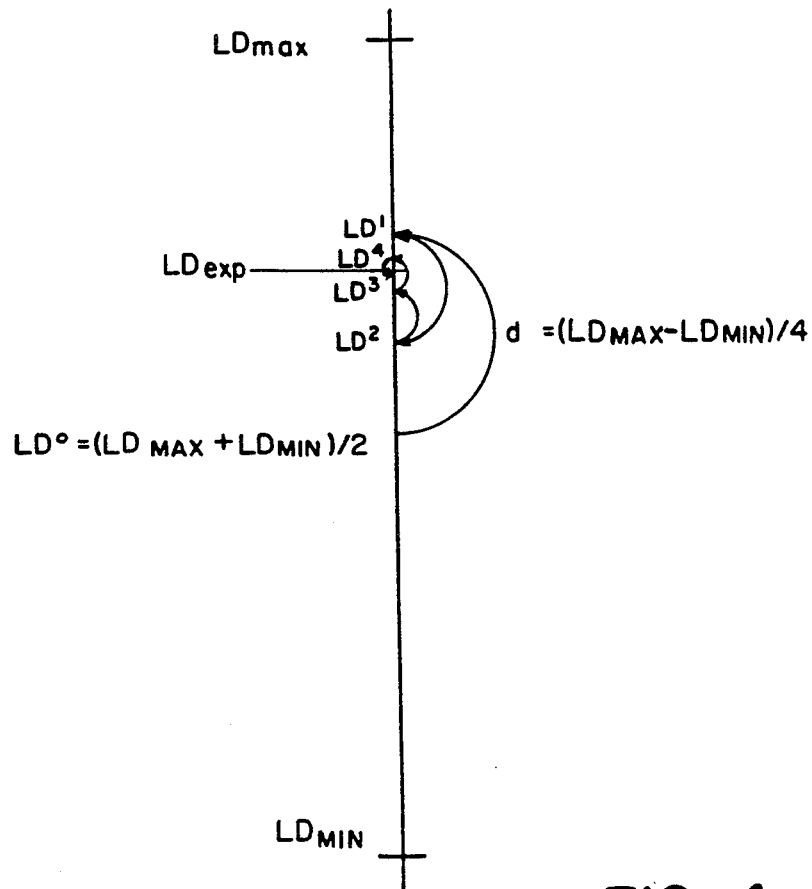
FIG. 4 schematically illustrates the iterative process for determining distortion and the bit allocation.

The iterative process 28 of determining the expected mse distortion and thus computing the bit allocation vector B from the expected distortion and power spectrum density P is illustrated in FIG. 4. The system searches for the best value LD using a bisecting search. Assume that the expected mse distortion which allows for full use of the available quantization bits is $LD_{exp}$. The system begins with an estimated value LD midway between the maximum and minimum possible values for LD. $LD_{max}$ and $LD_{min}$ are equal to the natural log of the maximum and minimum power respectively of the power spectrum P as specified in the look up table or by the nature of a specific signal and bit rate. ($P_{min}$ should be greater than zero, because log 0 is undefined.) From the first estimate of LD, $LD^o = (LD_{min} + LD_{max})/2$, the bit allocation vector B is computed from $r_i$, where $b_i$ is the value $r_i$ rounded to available quantizer levels. The total number of bits thus allocated is compared to the number of available bits. If the solution indicates that more bits may be used, indicating that a lower level of distortion may be obtained, the value LD is decreased. On the other hand, if the solution indicates that more than the available bits $B_T$ have been allocated, a greater distortion must be accepted to reduce the number of allocated bits.

In the example of FIG. 4, assume that the best solution is $LD_{exp}$. The first solution of B from $LD^o$ would indicate that too many bits were allocated. Therefore, the distortion would be increased from ($LD_{max} - LD_{min})/2$ to a level $LD^1$ toward $LD_{max}$. Specifically, $LD^1$ is the point bisecting the interval [$LD^o$, $LD_{max}$] computed as $LD^1 = LD^o + (LD_{max} - LD_{min})/4$. The bit allocation would be recomputed, and it would be determined from that new solution in this example that additional bits would be available and LD should be decreased. A new distortion level $LD^2$ bisecting the prior two distortion levels would then be used to solve again for the bit allocation B. This iterative process would continue until the number of allocated bits was equal to, or very near to, the available bit allocation $B_T$. Because the solution must be of integer values, the calculations may result in an oscillation about the level $LD_{exp}$. As discussed below, the system avoids such oscillation and fine tunes the bit allocation in a heuristic fashion.

Figure 5A:
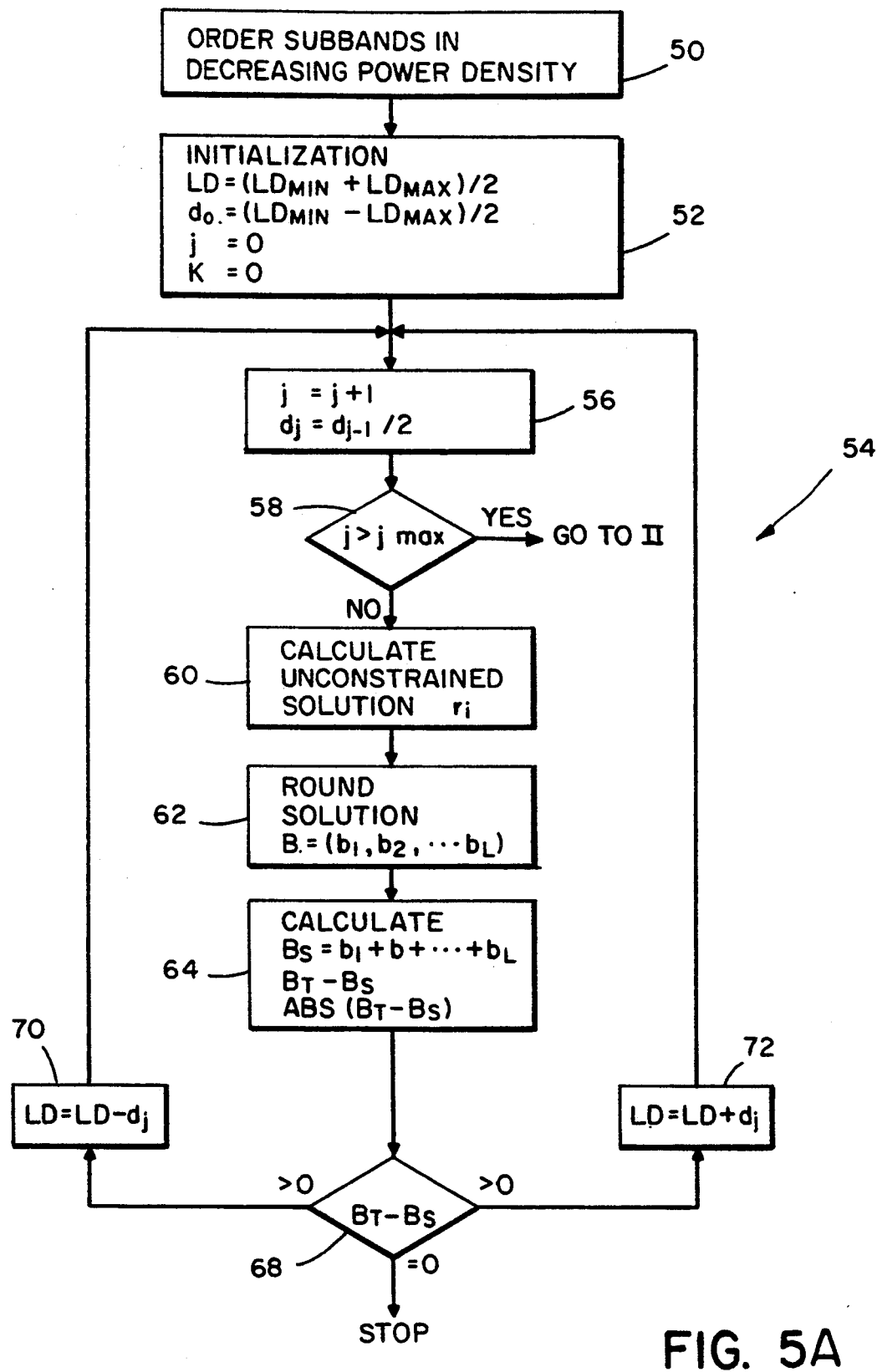
FIGS. 5A–5C is a flow chart of the process for determining bit allocation for each window of speech.
Figure 5B:
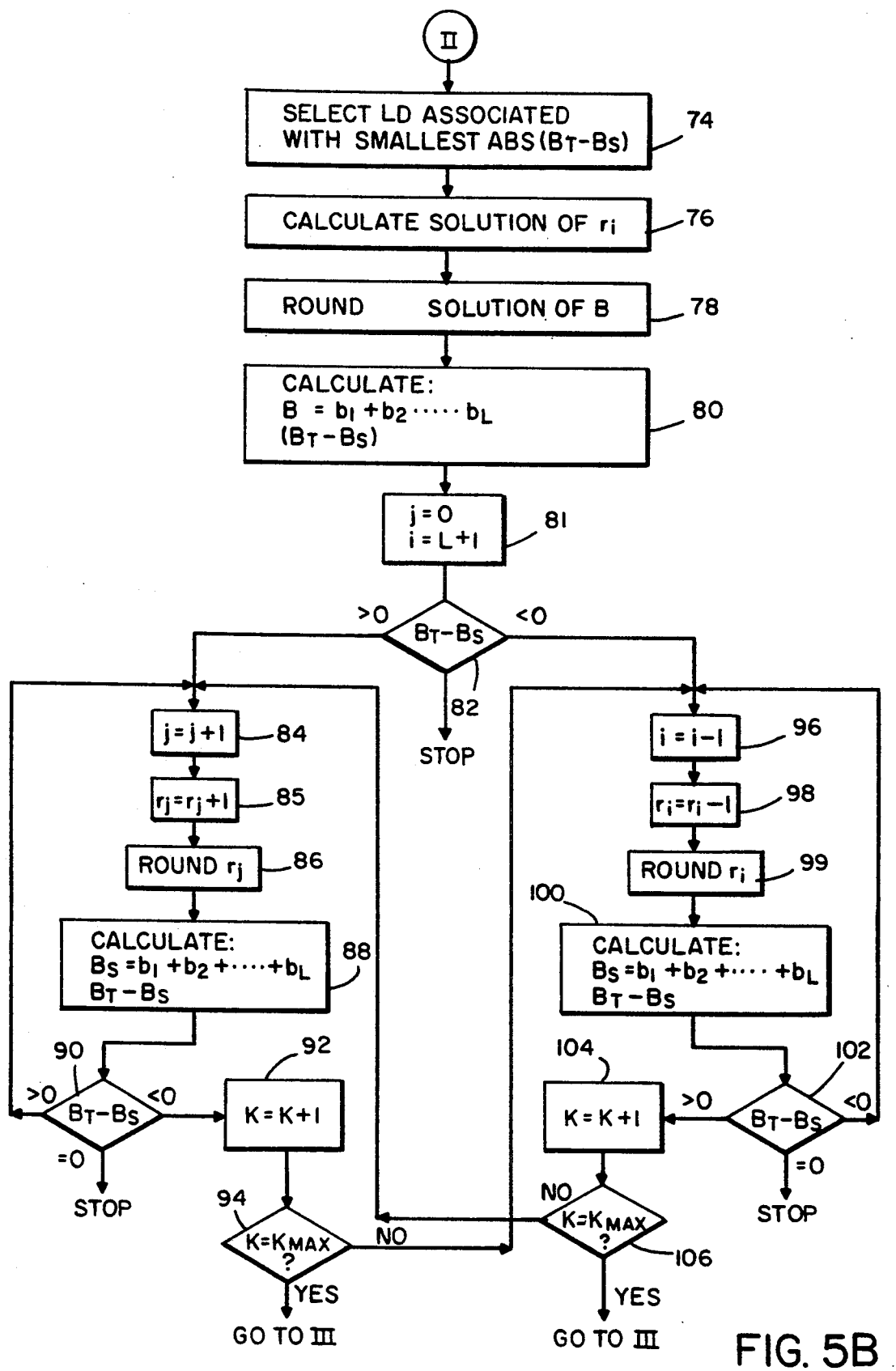
Figure 5C:
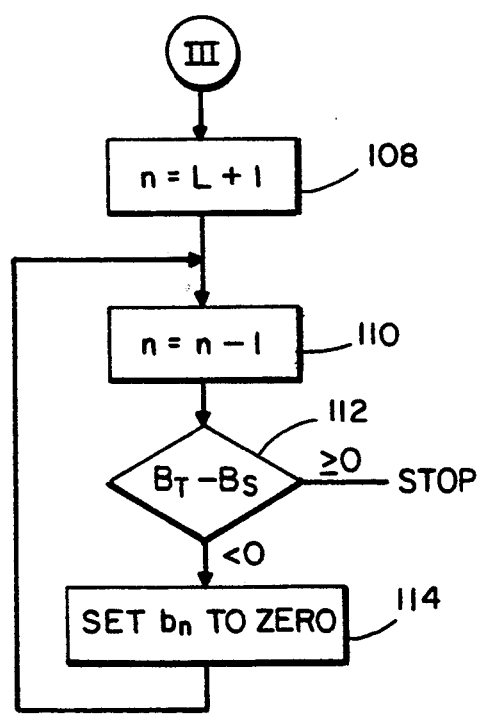

FIGS. 5A-5C illustrates the dynamic bit allocation procedure in greater detail. As noted above, power density for each subband is estimated by table lookup from the spectral envelope parameters determined for each subband. For purposes of determining the bit allocation, the subbands are then ordered in decreasing power density at 50. The system is initialized at 52. The initial distortion factor $\log_2 D^o = LD^o$ is computed as $(LD_{min} + LD_{max})/2$. An initial distortion increment value $d_0$ is set equal to $(LD_{max} - LD_{min})/2$. Two counter j and k for limiting the duration of searches are set at 0.

In a first loop 54 for performing the search illustrated in FIG. 4, j is set equal to j+1 and $d_j$ is set equal to $d_{j-1}/2$ at 56. To limit the search once the value LD is very near to the expected value $LD_{exp}$, j is compared to a value $j_{max}$ at 58. If the system has reached the maximum value of j, it goes to a heuristic fine-tuning step at II. Otherwise, the unconstrained solution of r is computed at 60. That solution is then rounded at 62 to $b_i$.

In the preferred available range of quantizer values, quantizers from minb equal to 2 bits per coefficient through maxb equal to 9 bits per coefficient are available. A zero bit quantizer is always included in the set of quantizers. Although it is preferred that quantizers are available at all integer values between minb and maxb, such is not a requirement. All solutions $r_i$ are rounded to the nearest available quantizer value. Specifically, in the present implementation if $r_i$ is computed to be 0.8, that value is rounded to b=0 since a bit quantizer is not available. Similarly, if $r_i$ is computed to be 1.1, it is rounded to $b_i = 2$, the nearest available quantizer level.

At 64, the sum of the bit allocations $B_S$ is computed, as are the difference between the the total available bits $B_T$ and $B_S$ and the absolute value of that difference. If it is determined at 68 that $B_T$ is equal to $B_S$, the system has the solution and stops. If the value is greater than zero, indicating that additional bits are available and the distortion level can be decreased. LD is set equal to $LD - d_j$ at 70 and the system returns to the beginning of loop 54. On the other hand, if the value $B_T - B_S$ is less than zero, indicating that too many bits were allocated and that a greater distortion must be accepted. LD is set equal to $LD + d_j$ and the system goes to the beginning of the loop 54.

Once the system has processed through the loop 54 to the point where j is greater than jmax at 58, a heuristic routine II is begun. From the prior loops at 54, the LD associated with the smallest value of the absolute value of $B_T - B_S$ is selected at 74 as the nearest solution. The solution of the B is then calculated again at 76 and rounded at 78. $B_S$ and $B_T - B_S$ are calculated at 80. Counters j and i are set to zero and L+1 respectively at 81. If $B_T - B_S$ is greater than zero, indicating that additional bits are available, one bit is added to the prerounded value $r_j$ beginning with the highest energy subband where j equals 1. To that end counter j is incremented at 84. One bit is added to $r_j$ at 85. The new solution is then rounded at 86 and $B_S$ and $B_T - B_S$ are computed at 88. If $B_T - B_S$ is then equal to zero the search stops. If it is still greater than zero the system loops back to 84 to increment the next value $r_j$.

It is possible for the addition of 1 bit at 85 to increase the number of rounded bits by 2. For example, if the prerounded $r_j$ had previously been 0.6, resulting in zero bits being allocated for that subband, the addition of one bit results in an unrounded value of 1.6 which results in two bits for that subband. If the addition of the bit results in $B_T - B_S$ being less than zero, the value k is incremented at 92 and compared to $k_{max}$ at 94. If k has not reached the maximum value the system moves to a decrementing loop beginning at 96. To avoid oscillation between incrementing and decrementing, once the value $k_{max}$ is reached, the system goes to a final step III.

If $B_T-B_S$ is found to be less than zero at either 82 or 90, bits must be decremented. At 96 the counter i is decremented. Decrementing of bits at 98 is then pre-rounded $r_i$ beginning with i=L, the lowest energy subband. The solution is rounded at 99, and $B_S$ and $B_T-B_S$ are recomputed at 100. So long as $B_T-B_S$ is found to be less than zero at either 82 or 102, the next lowest energy value $r_i$ is decremented at 98. If $B_T-B_S$ is found to be equal to zero at 102, the allocation is stopped. If it is found to be less than zero, k is incremented at 104 and compared to $k_{max}$ at 106. Again, once $k_{max}$ is reached the system goes to routine III. Otherwise the system goes to the incrementing step 84.

If the system fails to provide a $B_S$ equal to $B_T$ in step II, routine III is followed. A counter n is set at L+1 at 108 and decremented at 110. If it is determined at 112 that $B_T$ is greater than $B_S$ the system stops. One or more available bits may not be used. If the number of allocated bits is greater than $B_T$, the system sets the lower energy subband bits bn to zero at 114 beginning with n equal to L until $B_T-B_S \geq 0$.

As an alternative to incrementing and decrementing by power level, the system could increment or decrement subbands by order of frequency. Thus, for example, the additional bits in routine II could be added to the low frequency subbands and subtracted from the high frequency subbands.

From the computed bit allocation B, appropriate quantizers are applied to coefficients of selected subbands of the residual spectrum at 30. In a preferred implementation, the 2D quantizers range from minb=2 bits per coefficient to maxb=9 bits per coefficient, and each of these quantizers is designed using an approach presented by Linde, et al., "An Algorithm for Vector Quantizer Design," IEEE trans on Commun. Vol. COM 28, pp. 84–95, January 1980.

At the receiver, the spectral envelope estimate which is transmitted in frequency sequence is used to recalculate at 32 the signal power spectrum density $P=(P_1, P_2, \ldots, P_L)$. The power spectrum density is used to determine at 34 the corresponding bit allocation which in turn, controls the inverse quantization process 36 as well as the spectral replication process 38. As in the prior Mazor et al. approach, the coefficients of the subbands which are not transmitted are approximated by replication at 38 of transmitted subbands. Once the equalized spectrum of FIG. 3 is recreated by replication of subbands, a reproduction of the spectrum of FIG. 2 can be generated at 40 by applying the transmitted scale factors to the equalized spectrum. From that reproduction of the original Fourier transform, the speech can be obtained through an inverse FFT 42, an inverse scaler 46, a digital to analog converter and a reconstruction filter 48.

The important benefits associated with the dynamic bit allocation coding technique are (1) the coder is automatically optimized to match the specified coding rate, and (2) the coder's bit allocation is dynamically adjusted to track the signal short term spectrum. With these added capabilities the coder handles more effectively than the prior coder non-stationary signals like speech, non-speech signals like voiceband data, and variable rate coding.

The coding technique provides for excellent speech coding and reproduction at rates as low as 9.6 kb/s In terms of signal to noise ratio (SNR), the algorithm with the above specific implementation, outperforms the prior Mazor et al. algorithm by over 2 dB at 16 kb/s and by more than 1 dB at 9.6 kb/s. The improvement in performance is even more dramatic when voiceband data and DTMF (dual tone multifrequency) signals are considered. This coder handles very well up to 2400-b/s data at 16-kb/s compression rate and up to 1200-b/s data at 12-kb/s compression rate. On the other hand, the prior coder can only handle up to 1200-b/s data at 16-kb/s compression rate. In terms of SNR, this coder outperforms the prior coder by over 5 dB at 16 kb/s and 3 dB at 12 kb/s for voiceband data, and by over 6 dB at 16 kb/s as well as at 12 kb/s for DTMF signals.

While this invention has been particularly shown and described with references to preferred embodiments thereof, it will be understood by those skilled in the art that various changes in form and details may be made therein without departing from the spirit and scope of the invention as defined by the appended claims.

For example, transforms other than the Fourier Transform, such as the cosine transform, may be used. Also, the specific choice of available quantizers can vary. The encoding and decoding may be performed by dedicated hardware or in a software controlled system.

I claim:

1. A speech coding system comprising:

transform means for performing a discrete transform of a window of speech to generate a discrete transform spectrum of coefficients comprising a plurality of subbands of coefficients;

envelope defining and encoding means for defining an approximate envelope of the discrete spectrum of coefficients in each of the plurality of subbands of coefficients and for encoding the defined envelope of each subband of coefficients;

means for scaling each spectrum coefficient relative to the encoded defined envelope of the respective subband of coefficients;

a plurality of quantizers having different bit lengths for encoding the scaled spectrum coefficients within each subband; and means for determining a quantizer from the plurality of quantizers having different bit lengths, if any, to be used to encode the scaled spectrum coefficients of each subband within each window of speech wherein the selection of available quantizers used in successive windows is variable.

2. A speech coding system as claimed in claim 1 wherein the means for determining allocates bits to minimize quantization error for each window of speech.

3. A speech coding system as claimed in claim 1 wherein the means for determining iteratively estimates distortion and computes for each distortion estimate a bit allocation across the spectrum to allocate a predetermined number of bits.

4. A speech coding system as claimed in claim 3 wherein the means for determining computes the allocation of bits as a number of bits greater than or equal to zero which is derived from $\log_2(P_i/D)$ for each subband where $P_i$ is a power density estimate for the subband and D is a distortion error estimate for the window of speech.

5. A speech coding system as claimed in claim 4 wherein $P_i$ is estimated for each subband from the defined envelope of the respective subband of coefficients.

6. A speech coding system as claimed in claim 4 wherein the means for determining tunes the computed bit allocation toward the number of available bits by adding bits to higher energy subbands or subtracting bits from lower energy subbands.

7. A speech coding system as claimed in claim 6 wherein $P_i$ is estimated for each subband from the defined envelope of the respective subband of coefficients.

8. A speech coding system as claimed in claim 1 wherein the transform means performs a discrete Fourier transform.

9. A speech coding system as claimed in claim 1, wherein the means for determining a quantizer determines each quantizer based on the spectral envelope in the transform domain.

10. A speech coding system as claimed in claim 1, further comprising a power spectrum means for estimating spectral power density of each subband of coefficients, wherein the means for determining a quantizer determines each quantizer based upon the spectral power density of the subbands of coefficients.

11. A method of coding speech comprising:
performing a discrete transform of a window of speech to generate a discrete spectrum of coefficients comprising a plurality of subbands of coefficients;
defining an approximate envelope of the discrete spectrum of coefficients in each of the plurality of subbands of coefficients and digitally encoding the defined envelope of each subband of coefficients;
dynamically selecting a quantizer from a plurality of quantizers having different bit lengths for use with each subband of each window of speech to minimize distortion, the selection of available quantizers used in successive windows being variable and based on spectral power density of the window;
scaling the coefficients within the subbands relative to the defined approximate envelopes of the subbands; and
encoding each of the scaled coefficients within the subbands into a number of bits using the selected quantizer.

12. A method as claimed in claim 11 wherein the quantizers are determined to minimize quantization error for each window of speech.

13. A method as claimed in claim 11 wherein the quantizers are selected iteratively estimating distortion and computing for each distortion estimate a bit allocation across the spectrum to allocate a predetermined number of bits.

14. A method as claimed in claim 13 wherein the quantizers are selected computing the allocation of bits as a number of bits greater than or equal to zero which is derived from $\log_2 (P_i/D)$ for each subband where $P_i$ is a power density estimate for the subband and D is a distortion error estimate for the window of speech.

15. A method as claimed in claim 14 wherein $P_i$ is estimated for each subband from the defined envelope of the respective subband of coefficients.

16. A method as claimed in claim 14 wherein the allocation of bits is tuned toward the number of available bits by adding bits to higher energy subbands and subtracting bits from lower energy subbands.

17. A method as claimed in claim 16 wherein $P_i$ is estimated for each subband from the defined envelope of the respective subband of coefficients.

18. A method as claimed in claim 11 wherein the transform is a discrete Fourier transform.

* * * * *